US006473496B1

(12) United States Patent
Mohageg

(10) Patent No.: US 6,473,496 B1
(45) Date of Patent: Oct. 29, 2002

(54) METHOD FOR HANDLING TELEPHONE COMMANDS

(75) Inventor: Michael F. Mohageg, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/321,480

(22) Filed: May 27, 1999

(51) Int. Cl.[7] .............................................. H04M 11/00
(52) U.S. Cl. ................ 379/90.01; 379/93.23; 379/93.24; 379/110.01
(58) Field of Search ...................... 379/90.01, 110.01, 379/93.01, 93.05–93.08, 93.24–93.26, 93.35, 131, 140, 142.01, 102.01, 102.03

(56) References Cited

U.S. PATENT DOCUMENTS

| | | | | |
|---|---|---|---|---|
| 4,924,496 A | * | 5/1990 | Figa et al. ................... 379/131 |
| 5,170,427 A | * | 12/1992 | Guichard et al. | |
| 5,341,167 A | * | 8/1994 | Guichard et al. | |
| 5,416,831 A | * | 5/1995 | Chewning, III et al. | |
| 5,450,123 A | * | 9/1995 | Smith | |
| 5,548,635 A | * | 8/1996 | Bradley et al. ......... 379/102.03 |
| 5,598,463 A | * | 1/1997 | Saccardo et al. ......... 379/93.26 |
| 5,757,891 A | * | 5/1998 | Wang ....................... 379/93.24 |
| 5,761,280 A | * | 6/1998 | Noonen et al. ........... 379/93.05 |
| 5,835,577 A | * | 11/1998 | Disanto et al. ......... 379/100.15 |
| 5,903,632 A | * | 5/1999 | Brandon ..................... 379/140 |
| 5,923,736 A | * | 7/1999 | Shachar ................. 379/110.01 |
| 5,923,738 A | * | 7/1999 | Cardillo et al. .......... 379/90.01 |
| 5,945,989 A | * | 8/1999 | Freishtat et al. | |
| 6,118,856 A | * | 9/2000 | Paarsmarkt et al. ...... 379/90.01 |
| 6,285,364 B1 | * | 9/2001 | Giordano et al. ........... 345/804 |

* cited by examiner

*Primary Examiner*—Wing Chan
(74) *Attorney, Agent, or Firm*—Sierra Patent Group, Ltd.

(57) ABSTRACT

A telephone device and method for operating the telephone device. The telephone device has one bi-directional line connecting the telephone device to central office switching equipment. A memory in the telephone device contains at least one nontelephony application program. An application in the memory of the telephone device provides a method that determines when the telephone device is in an off-hook condition. The method then determines that at least one nontelephony application program command has been requested. In response to receiving the request, the method executes the at least one nontelephony application program command while the telphone device is in the off-hook condition.

12 Claims, 5 Drawing Sheets

METHOD FOR HANDLING TELEPHONE COMMANDS

BACKGROUND OF THE INVENTION

1. Field of the Invention

The present invention relates to telephone devices. More particularly, the invention provides a method for operating a telephone device which allows the execution of nontelephony commands while the telephone is in an off-hook condition.

2. The Background Art

Telephones have been used for many years for voice communication. Steady demand for more functionality has caused the capabilities of telephones and central office switching systems to improve. For example, older telephones often had rotary dials, and were capable of little more than a single-line voice call to another location. Design improvements have resulted in telephones which are much "smarter" than their predecessor devices, and which interface with a much smarter central office switching system.

Modern telephone devices often include provisions for handling features typically provided by a central office switching system such as call waiting, caller ID, etc.

Call waiting is a feature which gives a user who is already engaged in a first call an indication that a second call to them is being attempted by an external caller.

Caller ID is a feature which gives identifying information about an incoming call to a user, so that the user may determine whether to answer the call. Certain telephone devices known in the prior art are designed to store caller ID information about incoming calls in a database, so that information about missed calls may later be retrieved by a user.

In addition to handling call waiting and caller ID functions, some telephone devices are capable of displaying the length of a telephone call, displaying the current date and time, and for storing commonly used telephone numbers. While a call is in progress, however, such phones typically restrict the commands which may be initiated by a user to "telephony commands".

For purposes of this application, "telephony commands" are commands directly related to a call in progress. Thus, telephony commands are commands that are necessary to initiate or receive a call, monitor, and/or display the cost of the call, view the number dialed, put a call on "hold", and initiate a conference call.

While a prior art telephone device is off-hook, only telephony-related command functions are available to a user. It would therefore be beneficial to provide a method and apparatus for processing commands in a telephone device which allows a user more flexibility in the commands which may be issued during an active call.

Due to increased focus on the internet, electronic devices for accessing information stored in a remote location have become commonplace. However, those devices are typically very complex, and are distinct from and therefore do not involve traditional telephone operations. It would therefore be beneficial to provide an apparatus which integrates traditional telephone operations with operations involving non-traditional telephone operations such as reading and replying to email or browsing web pages that are cached on the telephone device.

SUMMARY OF THE INVENTION

A telephone apparatus and a method for handling user initiated telephone commands is disclosed herein. The apparatus includes a CPU, a data memory, a program memory, an audio device, a clock, a display manager, a display and a telco handler, and is capable of handling normal telephone operations as well as allowing a user to access and process email, and to access and review web page information cached within the telephone device. The telephone device is also capable of accessing and retrieving email and web page data from external servers.

The method includes determining that the telephone apparatus is in an off-hook condition, determining that at least one nontelephony application program command has been requested; and executing the at least one nontelephony application program command.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled person having the benefit of this disclosure.

The present invention telephone device allows a user to cause the execution of nontelephony command functions while the device is actively managing a call in progress. Such nontelephony command functions include, but are not limited to, viewing and editing a call log, viewing and editing an address book, reviewing and replying to electronic mail stored within the telephone device, and viewing web page data previously cached on the telephone device.

Figure 1:
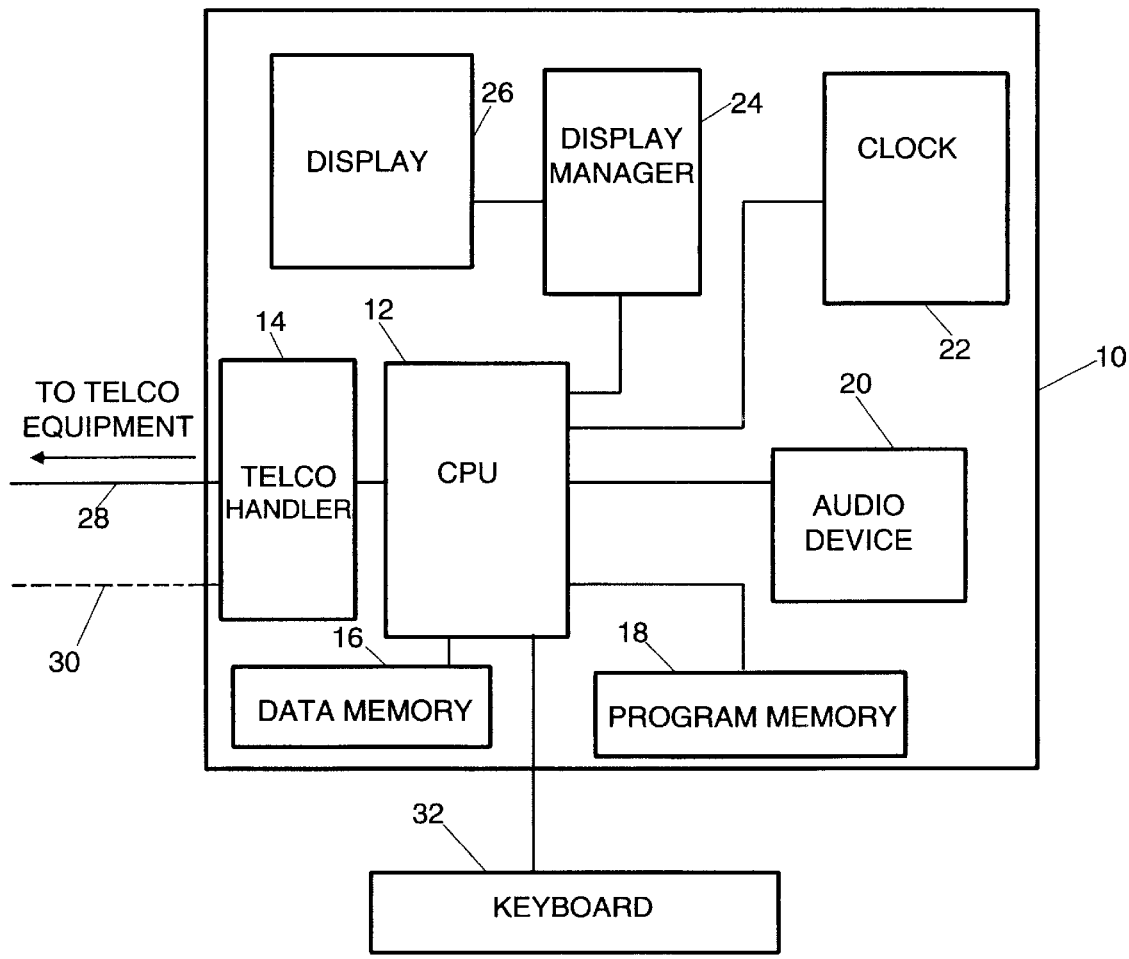
FIG. 1 is a block diagram of a present invention telephone device.

FIG. 1 is a block diagram of a present invention telephone device.

Referring to FIG. 1, telephone device 10 comprises a central processing unit (CPU) 12, telco handler 14, data memory 16, program memory 18, audio output device 20, clock 22, display manager 24, and display 26.

CPU 12 manages the entire operation of device 10, operating on program instructions which are stored in program memory 18, and storing and retrieving data using data memory 16.

Telco handler 14 is coupled to CPU 12 and one or more bidirectional communication lines 28 and 30. Line 30 is optional depending on the desired functions a given user may choose to implement. Telco handler 14 determines the type of call being initiated or received, and invokes the proper handling protocols. For example, if an outgoing call is determined to be to a computer system, telco handler invokes TCP/IP management circuits in order for the telephone device 10 to be able to communicate properly with the computer system. TCP/IP management circuits are well-known to those of ordinary skill in the art. If the outgoing call is a voice call, telco handler 14 may instead modulate lines 28 and 30 with audio received from audio device 20.

Audio device 20 may include a speaker, a telephone handset, any other suitable device. In this specification, the phrase "audio device" shall be used to define a device which is capable of operating as an audio input device or an audio output device. Such a device may have independent input and output blocks, such as in a telephone handset, or may instead have one device used for both input and output.

Time of day clock 22 is provided so that the time of a call or the duration of a call may easily be determined.

Display manager 24 is provided to manage the contents of display 26.

Data memory 16 is provided for the storage and retrieval of data used by CPU 12 during the performance of program instructions stored in program memory 18. Such data may include but is not limited to an address book having names, addresses, email addresses, last time called, and other information. Although data memory 16 and program memory 18 are shown in FIG. 1 as separate devices, those of ordinary skill in the art would readily recognize that data memory 16 and program memory 18 are drawn separately for clarity. Data memory 16 and program memory 18 may reside on the same physical memory device, so long as CPU 12 can access either memory space.

Optional keyboard 32 is provided so that users of telephone device 10 may easily input text-based data into telephone device 10. Text input may alternatively be provided by a user using the telephone keypad or a virtual display provided on the telephone display. A virtual display may optionally include a stylus adapted for the particular display keyboard employed.

Figure 2:
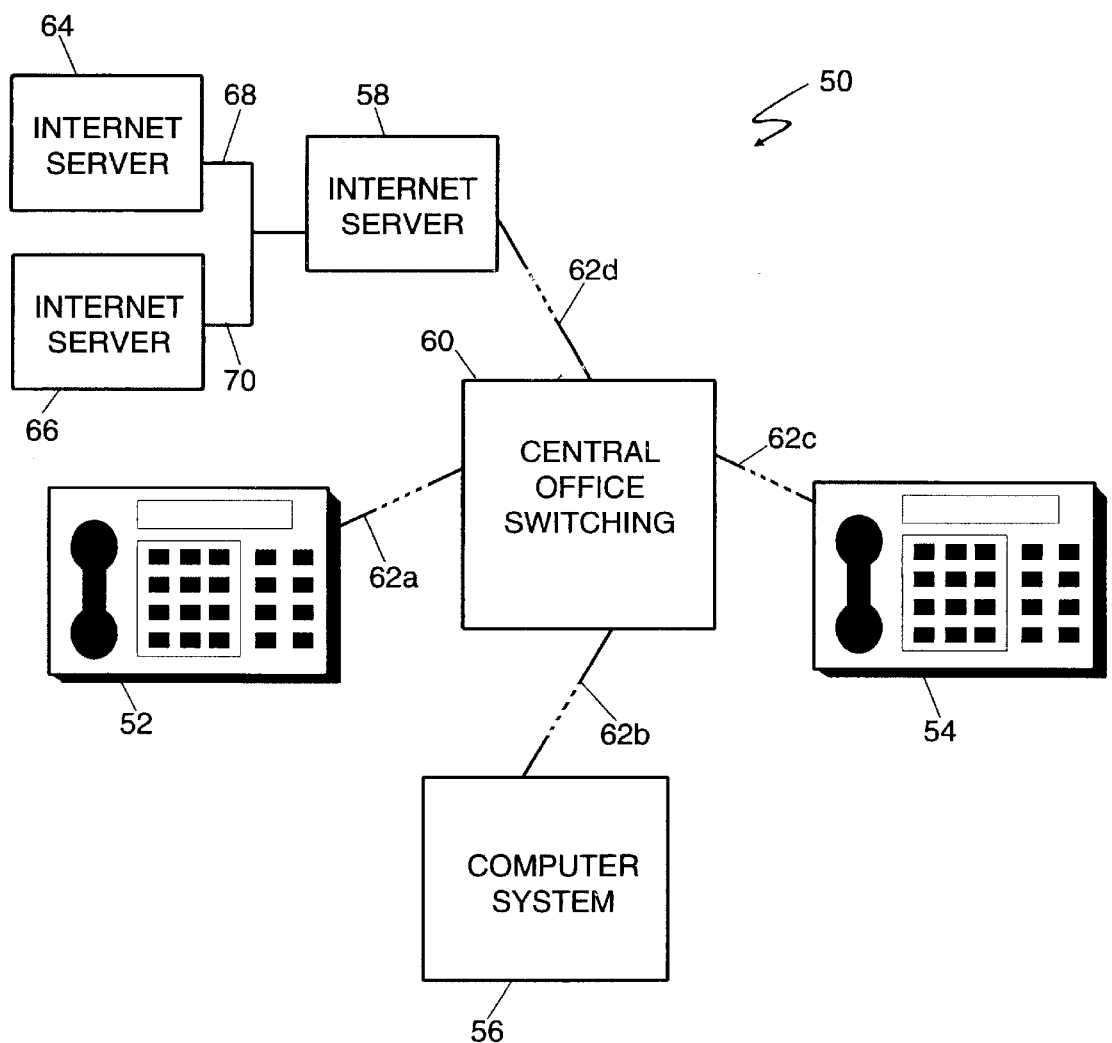
FIG. 2 is a diagram showing one embodiment of an electronic communication system showing an environment which employs the present invention.

FIG. 2 is a diagram showing one embodiment of an electronic communication system showing an environment which employs the present invention.

Referring to FIG. 2, system 50 includes present invention telephone device 52, prior art telephone device 54, computer system 56, internet server 58, and central switching office 60. Central switching office 60 is coupled to each of the other devices through bidirectional communication lines 62a, 62b, 62c, and 62d. Internet server 58 is coupled to other internet servers 64 and 66 through communication lines 68 and 70.

As those of ordinary skill in the art are already aware, each of the bidirectional lines 62a, 62b, 62c, and 62d have a telephone number assigned which is unique to each line. Switching office 60 acts as a central hub, receiving signals from one location over one bidirectional line and retransmitting those signals over a second bidirectional line. How the signals are handled by a transmitting station or by a receiving station depends on the capabilities of the transmitting and receiving devices and the character of the signal being communicated.

In the prior art, when a telephone call is initiated or received by a telephone device 54, the telephone device 54 typically dedicates itself to providing only functions and information to the user which relate directly to the call in progress. Functions available to users of prior art devices offer the user an opportunity to display the length of the call at any given time, display the current time and date, and display caller ID information relating to the calling station.

The present invention, however, allows a user of the present invention telephone device to perform nontelephony functions while a telephone call is in progress. Such nontelephony functions include, but are not limited to, reviewing and replying to electronic mail stored within the telephone device, reviewing web page information previously stored within the telephone device, reviewing or editing the call log, and adding, reviewing or editing address book entries stored within the telephone device.

Since one or more of the nontelephony functions involves reviewing or editing information gathered from an external source such as sources that are located on the internet, telephone device 52 is also capable of accessing and downloading email from remote servers such as servers, 58, 64, or 66, or browsing the world-wide-web.

In the prior art, telephone device 54 typically handles voice or data calls. However, while a call is in progress, prior art devices restrict the available commands to telephony commands such as displaying the length of a call, viewing the call status, and displaying the name of the remote party.

The present invention user interface allows a user to be involved in a call with a remote party and perform nontelephony commands while that call is in progress.

Figure 3A:
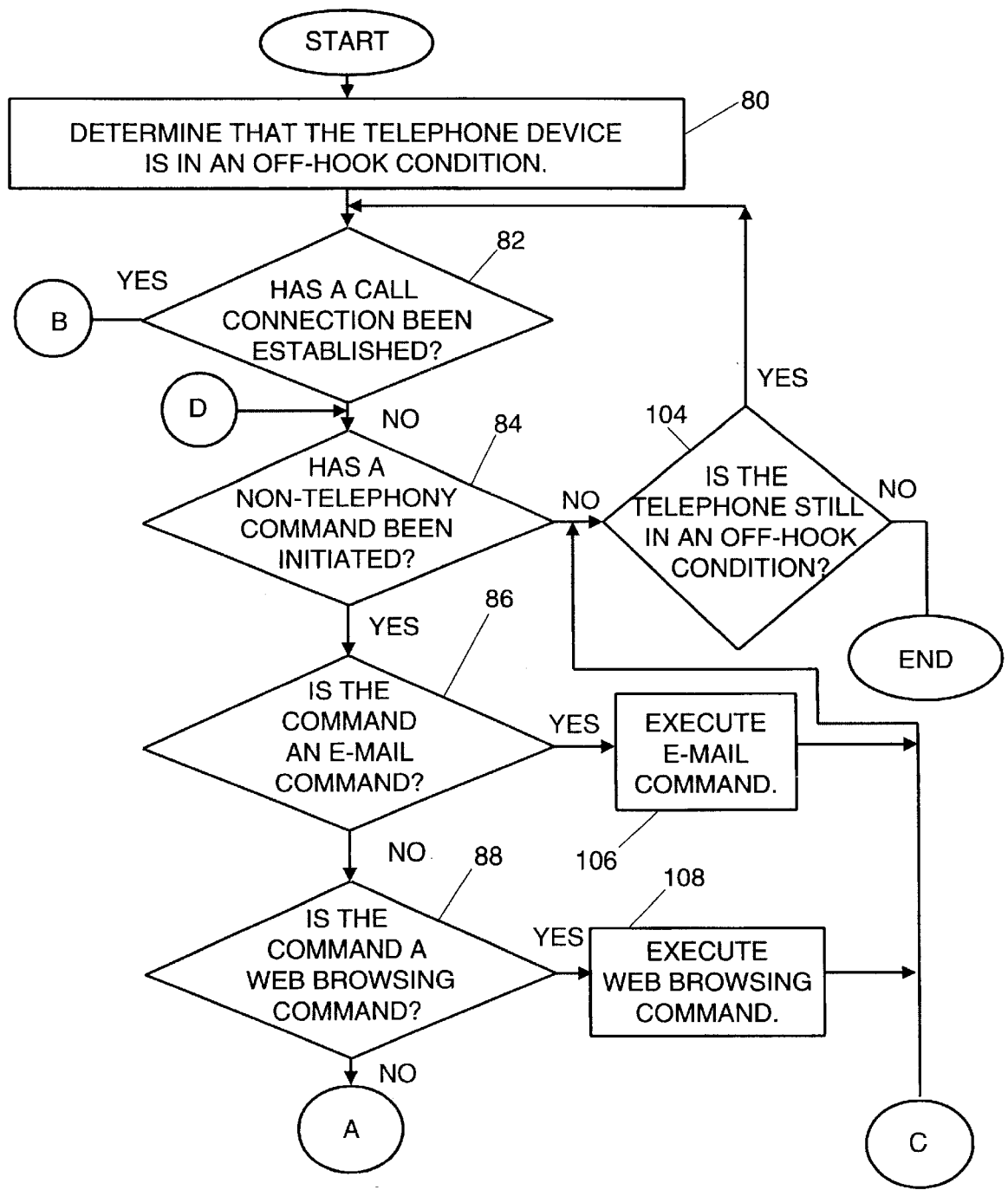
FIGS. 3A, 3B, and 3C together comprise a flow chart depicting a method according to one embodiment of the present invention.
Figure 3B:
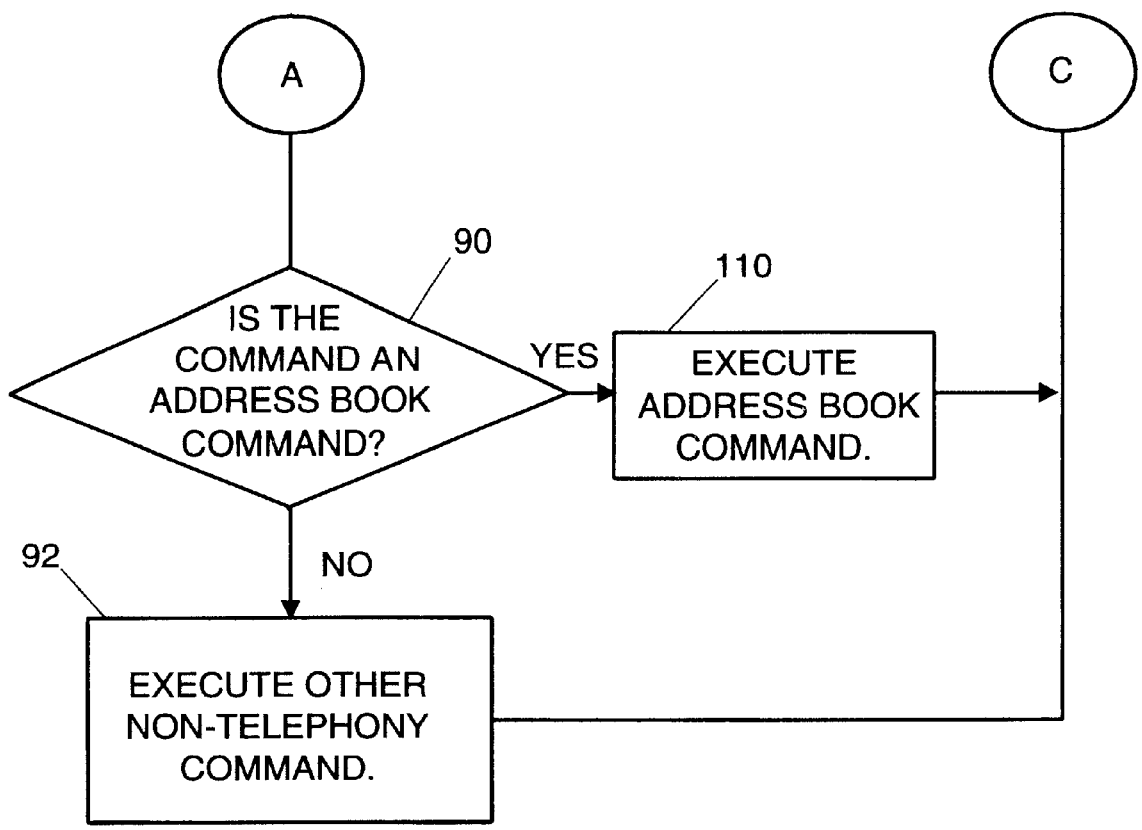
Figure 3C:
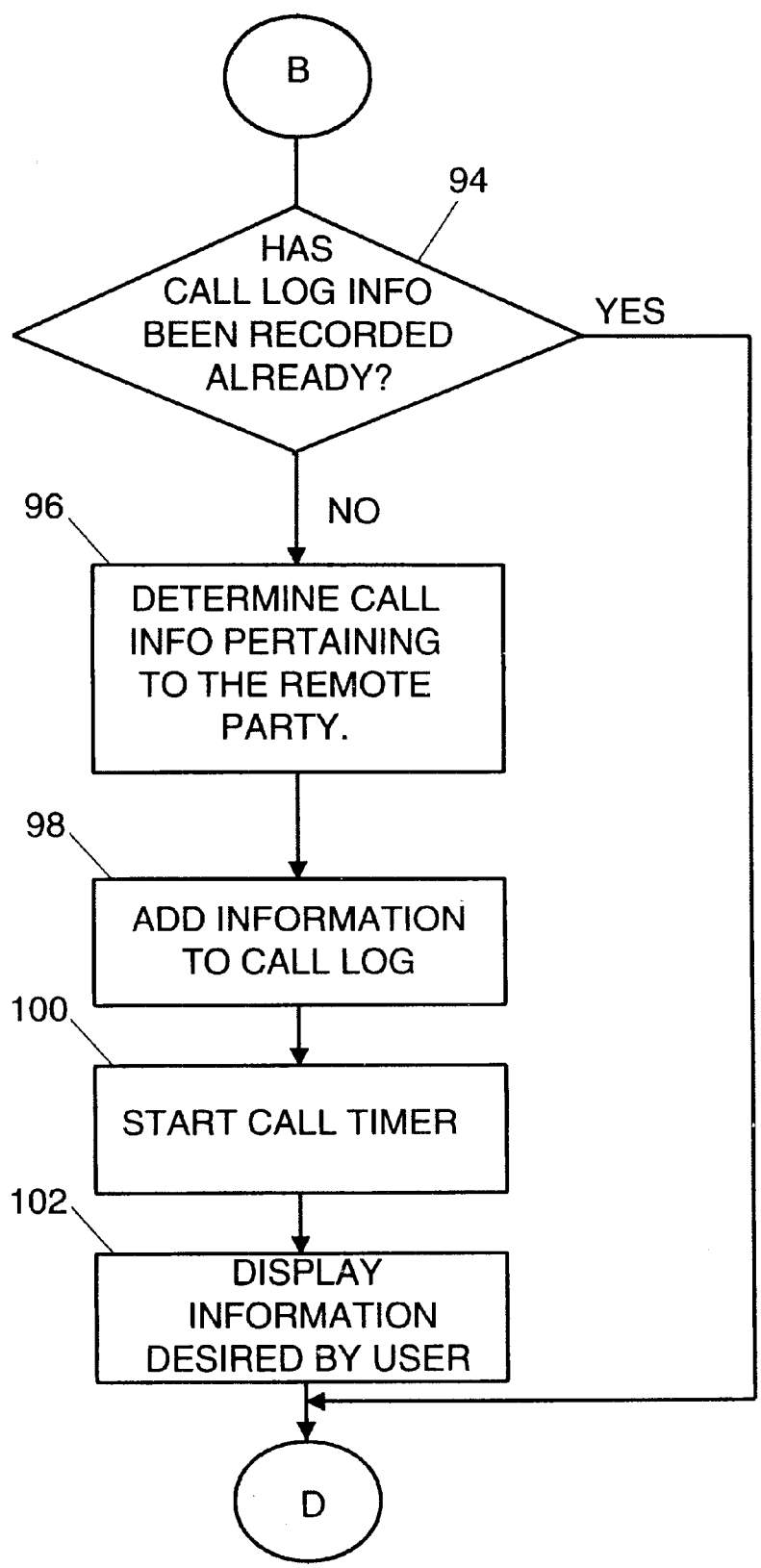

FIGS. 3A, 3B, and 3C together represent a flow chart depicting a method according to one embodiment of the present invention.

Those of ordinary skill in the art would readily recognize that the method disclosed herein has many possible variations and that steps in the disclosed method may be performed in many different logical sequences, without departing from the scope or purpose of the present invention.

Referring to FIGS. 3A, 3B, and 3C together, the method begins at block 80 when it is determined that telephone device 52 of the present invention is in an off-hook condition. It is not necessary that a call to a second party actually be established at this time, but it is necessary that an off-hook condition be detected.

At block 82 it is determined whether a connection with a remote telephone or computer device has actually been established and is in progress. If no, the method proceeds with block 84 where it is determined whether a nontelephony command has been initiated, and if so, the method proceeds with block 86 where it is determined whether the nontelephony command was an email command.

On a single line telephone device which is already off-hook, it is contemplated that email commands which are available to a user are those commands which don't require access to an external network. Such commands may include reading or replying to email previously received.

When a local telephone device is employed that has capability for simultaneous multiple-line use, it is contemplated that the email commands available to a user may include those commands available on the single line device, including additional commands which cause the two-line telephone device to download new email or transmit outgoing email previously stored on the local present invention telephone device.

If the nontelephony command was not an email command, the method proceeds with block 88 where it is determined whether the nontelephony command was a web browser related command.

On a single line telephone device which is already off-hook, it is contemplated that web browser commands which are available to a user are those commands which don't require access to an external network. Such commands may include reviewing web page data which has been previously cached on the present invention telephone device.

When a local telephone device is employed that has capability for simultaneous multiple-line use, it is contemplated that the web browsing commands available to a user may include those commands available on the single line device, but may further include commands for browsing web page information which has not been previously cached on the present invention telephone device.

If the nontelephony command was not a web browser related command, the method proceeds with block 90 where it is determined whether the nontelephony command is an address book command. If no, the method proceeds with block 92 where the nontelephony command is executed. It is contemplated that many types of application programs may be stored with telephone device 10 including programs which allow the following commands functions to be executed: reviewing a call log, editing a call log, creating a text file, editing a text file, reviewing a text file, creating calendar entries, editing calendar entries, viewing calendar entries, performing a keyword search, creating entries in a to-do list, editing entries in a to-do list, searching entries in a to-do list.

It is contemplated that present invention single-line and multi-line telephone devices will have similar command sets for processing address book commands. Such commands may include adding new entries, deleting old entries, editing or reviewing existing entries.

If, at block 82 a call connection had been established, the method proceeds with block 94 where it is determined whether call information pertaining to the present connection already exists in the call log. If no, the method proceeds with block 96 where call information pertaining to the present call is gathered. Call information may include, but is not limited to, the telephone number of the remote telephone device, the name of the remote party associated with the remote telephone number, the time a call connection was established, or whether the call was initiated by the local telephone device or was instead initiated by the remote party. It is contemplated that call information may be retrieved from the telephone company through such services as caller ID.

At block 98, call information collected at block 96 is logged into a call log provided for that purpose. A call log is simply a data file stored in data memory.

At block 100 an optional call timer, if required, is started.

At block 102, information desired by a user of the local telephone device is displayed on display 26. Displayed information may include, but is not limited to, the name of the remote party if available, the duration of the current call, and the telephone number associated with the remote telephone device. The method then proceeds with block 84.

If at block 94 call information had already been recorded for the call in progress, the method proceeds with block 84 as shown.

If at block 84 a nontelephony command had not been initiated, the method proceeds with block 104 where it is determined whether the local telephone device is still in an off-hook condition. If yes, the method proceeds with block 82. If no, the method ends.

If, at blocks 86, 88, or 90 it had been determined that the nontelephony command was of the type indicated by the given block, the method proceeds with block 104, 106, or 108 respectively where the appropriate nontelephony command is executed. Following the execution of that command, the method proceeds with block 104.

It is contemplated that the call log operations and address book operations may be linked together. For example, when the information pertaining to the remote connection has been determined at block 96, the present invention could determine whether an address book entry exists which pertains to the present connection. If yes, that information could be displayed to the user. If not, the system could ask the user if it is desired to create a new entry. If a new entry is desired, that entry could be created using a combination of information determined in block 96 and information supplied by the user.

Those of ordinary skill in the art would readily recognize that the steps in the method disclosed herein may be programmed using a high level computer language such as C++, BASIC, etc., or a lower level assembly language compatible with CPU 12, and then loaded into program memory for action by CPU 12. Alternatively, the commands may be programmed in a high-level description language such as verilog and then implemented as a state machine rather than using a CPU as disclosed herein.

While embodiments and applications of this invention have been shown and described, it would be apparent to those skilled in the art that many more modifications than mentioned above are possible without departing from the inventive concepts herein. The invention, therefore, in not to be restricted except in the spirit of the appended claims.

What is claimed is:

1. A method for operating a telephone device having a processing unit connected to a memory storing instructions for a nontelephony application executable by said processing unit, wherein the telephone device has a bidirectional line connecting said telephone device to central office switching equipment, the method comprising:

establishing an off-hook condition for said bidirectional line of said telephone device;

maintaining said off-hook condition of said bi-directional line;

receiving a request for said processing unit to execute said nontelephony application; and executing said application while said telephone device maintains said off-hook condition wherein said nontelephony application is executed separately from communication over said bi-directional line.

2. The method of claim 1 wherein said nontelephony application is an application for reading email stored within the telephone device.

3. The method of claim 1 wherein said nontelephony application is an application for composing an email to be temporarily stored within the memory of the telephone device and then later sent to an external recipient.

4. The method of claim 1 wherein said nontelephony application is an application for reviewing web page data stored within the telephone device.

5. The method of claim 1 wherein said nontelephony application program command is further defined as a command for reviewing address book entries stored within the telephone device.

6. The method of claim 1 wherein said nontelephony application is an application for editing address book entries stored within the telephone device.

7. The method of claim 1 wherein said nontelephony application is an application for performing a task chosen from the following group consisting of: reviewing a call log, editing a call log, creating a text file, reviewing a text file, creating calendar entries, editing calendar entries, performing a keyword search, creating entries in a to-do list, editing entries in a to-do list, and searching entries in a to-do list.

8. A machine readable medium having instructions thereon for performing a method for operating a telephone device wherein said telephone device has a bidirectional line connecting said telephone device to central office switching equipment and a memory storing a nontelephony application executable by a processing unit in the telephone device, the method comprising:

establishing an off-hook condition of the bidirectional line of the telephone device;

maintaining said off-hook condition of the bidirectional line;

receiving a request for said least one telephony application; and executing said nontelephony application while the telephone device maintains said off-hook condition wherein said one of said nontelephony application is executed separately from communications over said bidirectional line.

9. The machine readable medium of claim 8 wherein said nontelephony application is an application for reading email stored within the telephone device.

10. The machine readable medium of claim 8 wherein said nontelephony application is an application for receiving web page data stored within the telephone device.

11. The machine readable medium of claim 8 wherein said nontelephony application is an application for receiving address book entries stored within the telephone device.

12. A telephone device comprising:

command processing means;

program memory coupled to said command processing means and having at least one a nontelephony application program stored therein;

wherein said command processing means is capable of performing commands pertaining to said nontelephony application while said telephone device is in an off-hook state and separately from communication over a bidirectional line connecting said telephone device to a switching system.

\* \* \* \* \*